United States Patent Office 3,134,636
Patented May 26, 1964

3,134,636
FILAMENTARY MATERIAL
Robert William Singleton, New York, N.Y., assignor to Celanese Corporation of America, New York, N.Y., a corporation of Delaware
No Drawing. Filed Feb. 23, 1961, Ser. No. 90,930
15 Claims. (Cl. 8—55)

This invention relates to filamentary material comprising a high molecular weight oxymethylene polymer and particularly to colored filamentary material.

It is known that filamentary material of high tenacity and modulus may be prepared by the extrusion of high molecular weight oxymethylene polymers. Oxymethylene polymers, having successively recurring —$CH_2O$—units may be prepared by the polymerization of anhydrous formaldehyde or by the polymerization of trioxane which is a cyclic trimer of formaldehyde.

High molecular weight oxymethylene polymers may be prepared in high yields and at rapid reaction rates by the use of acidic boron fluoride-containing catalysts such as boron fluoride itself, and boron fluoride coordinate complexes with organic compounds in which oxygen or sulfur is the donor atom, as described in application Ser. Nos. 691,144 and 691,143, both filed October 21, 1957, by Hudgin and Berardinelli, and incorporated herein by reference.

Oxymethylene polymers of improved thermal stability have been prepared by copolymerizing trioxane wtih from 0.5 to 25 mol percent of a cyclic ether having adjacent carbon atoms. Copolymers of this type are described in application Serial No. 718,148, filed February 28, 1958, by Walling, Brown and Bartz, and incorporated herein by reference. The preferred copolymers are those made up of oxymethylene and oxyethylene groups, such as copolymers of trioxane with dioxolane or with ethylene oxide.

Among the oxymethylene polymers which may be used in the filamentary material are oxymethylene homopolymers, with stabilizing end groups if desired, and oxymethylene copolymers, particularly those having a recurring structure comprising recurring units having the formula

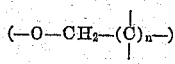

wherein $n$ is an integer from zero to 5 and wherein $n$ is zero in from 75 to 99.5 percent of the recurring units.

A preferred class of copolymers are those having a structure comprising recurring units having the fomula (—O—$CH_2$—$(CH_2)_n$—) wherein $n$ is an integer from zero to 2 and wherein $n$ is zero in from 75 to 99.5 percent of the recurring units. These copolymers are prepared by copolymerizing trioxane with a cyclic ether having the structure

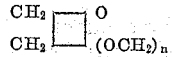

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

Filamentary material made from oxymethylene homopolymers and copolymers are difficult to dye with most classes of dyestuffs since they are not substantive to such dyestuffs. Attempts to dye oxymethylene polymer filamentary material with acid dyes, direct dyes, premetalized dyes and basic dyes have not been successful in that the filamentary material could not develop a full shade of the desired coloring and could not take up as much as about 0.1% of its weight of the dyes from baths containing practical amounts of dyestuff in dyeing periods of two hours.

It is an object of this invention to provide colored filamentary material from oxymethylene polymers. Other objects will appear hereinafter.

In accordance with this invention a filamentary material is provided comprising filaments of a high molecular weight oxymethylene polymer, said material being colored by a disperse dyestuff.

The disperse dyes which are applied to filamentary material in accordance with this invention are generally those which are applied in the form of a dispersion in an aqueous bath. These dyes have long been applied to secondary cellulose acetate and include materials from the classes of azo dyes, anthraquinone dyes and aryl amine dyes. Specific examples of these dyes are 2-nitro-4-sulfonanilido diphenylamine;
4-ethoxy-2-nitrodiphenylamine-β-hydroxypropylamide;
4-nitro-2-methoxyphenyl azo 4'-bis(betahydroxyethyl) amino-2'-acetylamino benzene;
4-nitro-2-methylsulfonephenyl azo 4'-(N-beta-hydroxyethyl-N-difluoroethyl)aminobenzene;
4-nitro-2-chlorophenyl azo 4'-bis(beta-hydroxyethyl) amino-2'-methylbenzene;
1-hydroxyethyl-amino-4-hydroxyethylamino-5-hydroxy-8-hydroxy anthraquinone;
4'-nitrophenyl azo 4-di-β-hydroxyethylamino-2'-acetaminobenzene; a mixture of
1,4-di(hydroxy-ethylamino)-5,8-dihydroxy anthraquinone and
1-amino-4-anilido anthraquinone;
1,5-dihydroxy-8-nitro-4-(meta-alpha-hydroxyethyl) anilido anthraquinone;
1,8-dihydroxy-4-(para-beta-hydroxyethyl) anilido-5-nitro anthraquinone;
1-amino-4-anilido anthraquinone; and
2,4-dinitro-6-chlorophenyl azo 4'-bis (hydroxyethyl) amino-2'-acetylamino-5'-methoxy benzene;
1-amino-4-hydroxy anthraquinone; and
1-methylamino-4-β-hydroxyethylamino anthraquinone.

These dyestuffs, as sold, are in the form of mixtures of a dispersing agent, such as sodium lignosulfonate or the sodium salt of formaldehyde-naphthalene sulfonic acid condensation product, with the actual dye material, and usually contain about 30 to 45% of the actual dye material.

The filamentary material may be in the form of staple or in the form of substantially continuous filaments and includes tows, yarns, rovings, slivers, non-woven battings and fabrics.

The filamentary material is prepared from the homopolymers and copolymers described above, generally by melt spinning, although dry and wet spinning methods may also be used. Usually one or more thermal stabilizers are incorporated into the polymer in order to reduce degradation during spinning.

The proportion of stabilizer incorporated depends upon the specific stabilizer used. A proportion between about 0.05 and 10 weight percent (based on the weight of polymer) has been found to be suitable for most stabilizers.

One suitable stabilizer system is a combination of an anti-oxidant ingredient such as phenolic anti-oxidant and most suitably a substituted bisphenol, and an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bis-phenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having amidine groups, cycloaliphatic amine compounds and aliphatic acylureas. Suitable scission inhibitors as well as suitable anti-oxidants and proportions are disclosed in application Ser. No. 826,115, filed by Dolce on July 10, 1959; application Ser. No. 831,720, filed by Dolce, Berardinelli and Hudgin on August 5, 1959; application Ser. No. 838,427, filed by Berardinelli on September 8, 1959; application Ser. No. 838,832, filed by Dolce and Hudgin on September 9, 1959; application Ser No. 841,690, filed by Kray and Dolce on September 23, 1959; application Ser. No. 851,560, filed by Berardinelli, Kray and Dolce on November 9, 1959; application Ser. No. 1,457, filed by Dolce and Berardinelli on January 11, 1960; and application Ser. No. 4,881, filed by Kray and Dolce on January 27, 1960. The disclosures of the above-mentioned applications are incorporated herein by reference.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the stabilizers is by blending a dry solid stabilizer into the plastic polymer while the latter is being kneaded as on heated rolls or through an extruder.

Spinning methods and conditions are disclosed in copending application Ser No. 44,543 of Albert G. Williams and in application Ser. No. 44,544 of Donald E. Hudgin and Frank M. Berardinelli, both filed July 22, 1960, and both incorporated herein by reference. Methods and conditions for orientation of the filamentary material by drawing are also disclosed in these copending applications.

The filamentary material is usually prepared for dyeing by scouring. The material is treated in a hot aqueous solution of a detergent or alkali to remove soil. Trisodium phosphate or tetrasodium pyrophosphate are generally used in solution of about 1 to 5 weight percent, based on the weight of fiber. The temperature of scouring is generally between about 70° and about 90° C. and the scouring operation is usually maintained for at least 30 minutes.

In the dyeing operation any equipment and techniques suitable for the thorough impregnation of the filamentary material may be used. The disperse dye is usually maintained in the dyebath in a concentration between about 0.01 and about 500 weight percent, based on the weight of the filamentary material, between about .01 and 10 weight percent being preferred for a finite dyebath and between about 100 and 500 weight percent being preferred for a simulated infinite dyebath. The dyebath temperature is usually maintained between about 80° and about 100° C. and the residence time of the filamentary material in the dyebath is between about ½ hour and about 4 hours.

Carriers, such as ortho phenyl phenol, benzoic acid and methyl para toluate, may be included in the dyebath in concentrations between about 2 and about 20 weight percent, based on the weight of the fiber.

Suitable dispersing agents and water softeners may be added to the dyebath to promote optimum dyeing conditions. The nature and amount of such material is dependent on the nature of the disperse dye and the hardness of the available water. After impregnation, excess dyestuff is removed by scouring and the filamentary material is dried.

Example

A trioxane-dioxolane copolymer (4 wt. percent of monomeric units derived from dioxolane) having an inherent viscosity of 1.2 (measured at 60° C. in 0.1 wt. percent solution in p-chlorophenol containing 2 wt. percent of α-pinene) was stabilized with 1 wt. percent each of 2,2'-methylene bis-(4-methyl-6-tertiary butyl phenol) and malonamide. 91 parts by weight of this stabilized copolymer was blended with 27.3 parts of dimethyl formamide by heating in a closed container in an oven for 4 hours followed by rolling on a mill for 5 minutes. The rolls of the mill were maintained at about 160°. The polymer was removed from the rolls, cut up and ground into pellets and the pellets were melt spun in a screw spinner. The spinner jet had 10 holes of 0.020" diameter. The screw temperature was 175–180° C. and the jet temperature was 175° C. The take-up speed was 200 meters/min. and the spun yarn had a denier of 231. The spun fiber was drawn over a 12" long shoe heated to 133° C. The draw ratio was 9.05 to 1 and the draw speed was 11 meters/min. The drawn yarn had a denier of 25.6 and a tenacity of 6.0 g./d. with 21% elongation.

The fiber (100 mg.), after scouring, was immersed in a simulated infinite dye bath containing 300 mg. of disperse dye in 600 ml. of water and maintained at 97° C. for one hour. The dye used was Eastone Red NGLF (C.I. Disperse Red 35). After extraction with perchlorethylene and drying, the fiber was found to have taken up 1.1% of its weight of the dye.

It is to be understood that the foregoing detailed description is given merely by way of illustration and that many variations may be made therein without departing from the spirit of my invention.

Having described my invention what I desire to secure by Letters Patent is:

1. Filamentary material comprising filaments of a high molecular weight oxymethylene polymer, said material being colored by a disperse dyestuff.

2. Filamentary material comprising filaments of a high molecular weight oxymethylene polymer, said material being colored by at least 1 weight percent, based on the weight of the filamentary material of a disperse dyestuff.

3. Filamentary material comprising filaments of a high molecular weight oxymethylene copolymer having from 0.5 to 25 mol percent of oxyalkylene units with adjacent carbon atoms, said filamentary material comprising filaments having a tenacity in excess of 5 g./d. and being colored by a disperse dyestuff.

4. The filamentary material of claim 2 wherein said disperse dyestuff is an azo dye.

5. The filamentary material of claim 2 wherein said disperse dyestuff is an anthraquinone dye.

6. The filamentary material of claim 2 wherein said disperse dyestuff is an aryl amine dye.

7. Method of dyeing a filamentary material comprising filaments of a high molecular weight oxymethylene polymer which comprises maintaining said material in contact with an aqueous dyebath containing a disperse dyestuff.

8. Method of dyeing a filamentary material comprising filaments of a high molecular weight oxymethylene polymer which comprises maintaining said material in contact with an aqueous dyebath containing from .01 to 10 weight percent, based on the weight of the filamentary material, of a disperse dyestuff at a temperature between about 80° and about 95° C. for a period between about 30 min. and about 4 hours.

9. Method of claim 8 wherein said oxymethylene polymer is a copolymer having from 0.5 to 25 mol percent of oxyalkylene units with adjacent carbon atoms.

10. Method of dyeing a filamentary material comprising filaments of a high molecular weight oxymethylene polymer which comprises maintaining said material in contact with an aqueous dyebath containing from 100 to 500 weight percent, based on the weight of the filamentary material, of a disperse dyestuff at a temperature between about 80° and about 95° C. for a period between about 30 min. and about 4 hours.

11. Method of claim 10 wherein said oxymethylene polymer is a copolymer having from 0.5 to 25 mol percent of oxyalkylene units with adjacent carbon atoms.

12. Filamentary material comprising filaments of a high molecular weight oxymethylene polymer having a recurring structure comprising recurring units having the formula

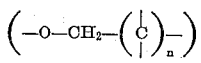

wherein $n$ is an integer from zero to 5 and wherein $n$ is zero in from 75 to 99.5 percent of the recurring units, said material being colored by a disperse dyestuff.

13. Filamentary material comprising filaments of a high molecular weight oxymethylene polymer having the formula $(-O-CH_2-(CH_2)_n-)$ wherein $n$ is an integer from zero to 2 and wherein $n$ is zero in from 75 to 99.5 percent of the recurring units, said material being colored by a disperse dyestuff.

14. Method of dyeing a filamentary material comprising filaments of a high molecular weight oxymethylene polymer which comprises maintaining said material in contact with an aqueous dyebath containing a disperse dyestuff, said polymer having a recurring structure comprising recurring units having the formula

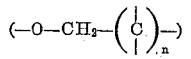

wherein $n$ is an integer from zero to 5 and wherein $n$ is zero in from 75 to 99.5 percent of the recurring units.

15. Method of dyeing a filamentary material comprising filaments of a high molecular weight oxymethylene polymer which comprises maintaining said material in contact with an aqueous dyebath containing a disperse dyestuff, said polymer having the formula $(-O-CH_2-(CH_2)_n-)$ wherein $n$ is an integer from zero to 2 and wherein $n$ is zero in from 75 to 99.5 percent of the recurring units.

References Cited in the file of this patent

UNITED STATES PATENTS

| | | |
|---|---|---|
| 2,768,994 | MacDonald | Oct. 30, 1956 |
| 2,966,476 | Kraloved et al. | Dec. 27, 1960 |
| 2,989,358 | Jurgeleit | June 20, 1961 |
| 2,989,506 | Hudgin et al. | June 20, 1961 |
| 2,989,507 | Hudgin et al. | June 20, 1961 |

FOREIGN PATENTS

| | | |
|---|---|---|
| 814,582 | Great Britain | June 10, 1959 |